US007407528B2

(12) United States Patent
Rittner et al.

(10) Patent No.: US 7,407,528 B2
(45) Date of Patent: Aug. 5, 2008

(54) METHOD FOR OPERATING AN AIR FRACTIONIZATION INSTALLATION FOR OBTAINING OXYGEN ON BOARD AN AIRCRAFT

(75) Inventors: Wolfgang Rittner, Siblin (DE); Rüdiger Meckes, Berkentin (DE); Jürgen Pfennig, Märkische Helde (DE)

(73) Assignee: DAe Systems GmbH, Lübeck (DE)

( * ) Notice: Subject to any disclaimer, the term of this patent is extended or adjusted under 35 U.S.C. 154(b) by 392 days.

(21) Appl. No.: 11/141,117

(22) Filed: May 31, 2005

(65) Prior Publication Data

US 2006/0021505 A1 Feb. 2, 2006

(30) Foreign Application Priority Data

Jun. 1, 2004 (DE) ...................... 10 2004 026 650

(51) Int. Cl.
*B01D 53/047* (2006.01)

(52) U.S. Cl. ...................... 95/11; 95/13; 95/23; 95/98; 95/128; 96/110; 96/111; 96/130

(58) Field of Classification Search ...................... 95/8, 95/11, 13, 23, 96, 98, 105, 128, 148; 96/110, 96/111, 121, 130, 397; 128/204.18, 205.27
See application file for complete search history.

(56) References Cited

U.S. PATENT DOCUMENTS

| | | | | |
|---|---|---|---|---|
| 4,247,311 | A | | 1/1981 | Seibert et al. |
| 4,312,641 | A | * | 1/1982 | Verrando et al. .............. 95/105 |
| 4,404,005 | A | | 9/1983 | Hamlin et al. |
| 4,875,911 | A | * | 10/1989 | Mizuno et al. ................ 96/115 |
| 4,898,599 | A | * | 2/1990 | Settlemyer ..................... 95/92 |
| 5,015,272 | A | * | 5/1991 | Okada et al. ................... 95/26 |
| 5,389,125 | A | * | 2/1995 | Thayer et al. .................. 95/11 |
| 5,529,607 | A | * | 6/1996 | Tan .............................. 95/12 |
| 5,906,672 | A | * | 5/1999 | Michaels et al. ............... 95/12 |
| 5,917,135 | A | | 6/1999 | Michaels et al. |

FOREIGN PATENT DOCUMENTS

| | | |
|---|---|---|
| DE | 693 23 481 T2 | 8/1994 |
| DE | 43 27 524 A1 | 2/1995 |

* cited by examiner

*Primary Examiner*—Frank M. Lawrence
(74) *Attorney, Agent, or Firm*—McGlew & Tuttle, P.C.

(57) ABSTRACT

The method serves for operating an air fractionization installation for obtaining oxygen on board an aircraft, with at least two molecular sieve chambers. A part mass flow of the oxygen obtained in the respective adsorbing molecular sieve chamber is supplied for flushing a desorbing molecular sieve chamber. The quantity of the flushing oxygen led to the desorbing molecular sieve chamber is controlled by way of this.

17 Claims, 1 Drawing Sheet

8
2
4
6
12
18
20
14
16
10

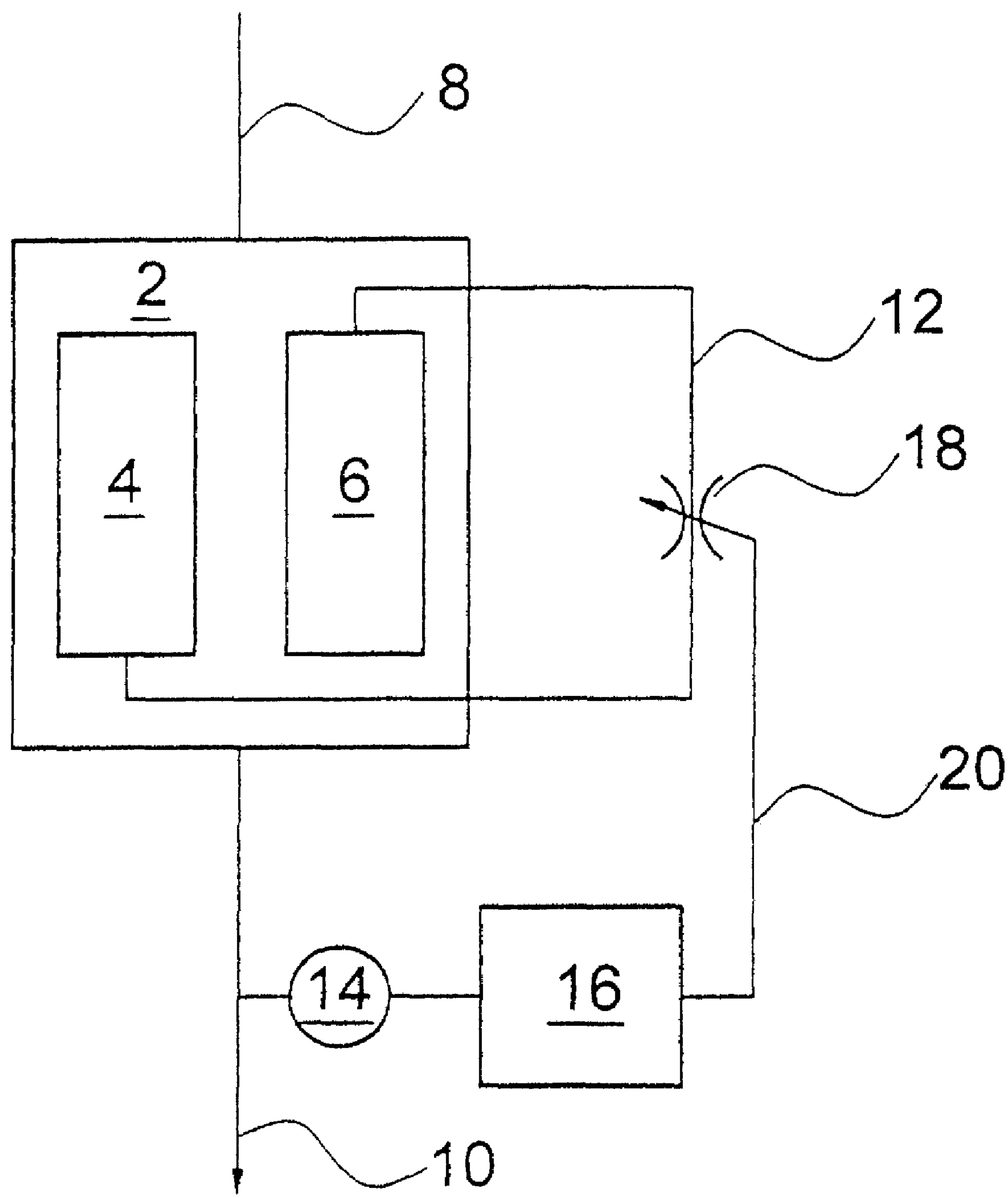
8
2
4
6
12
18
20
14
16
10

METHOD FOR OPERATING AN AIR FRACTIONIZATION INSTALLATION FOR OBTAINING OXYGEN ON BOARD AN AIRCRAFT

CROSS REFERENCE TO RELATED APPLICATIONS

This application claims the benefit of priority under 35 U.S.C. §119 of German Application DE 10 2004 026 650.6 filed Jun. 1, 2004, the entire contents of which are incorporated herein by reference.

FIELD OF THE INVENTION

The invention relates to a method for operating an air fractionization installation for obtaining oxygen on board an aircraft with at least two molecular sieve chambers, as well as to an air fractionization installation for carrying out this method.

BACKGROUND OF THE INVENTION

For obtaining oxygen on board aircraft, usually air fractionization installations are applied which separate the air constituents of nitrogen and oxygen from one another according to the principle of pressure swing adsorption.

With this, the air fractionization is effected such that air is led through a molecular sieve at an increased pressure, wherein the easily adsorbable nitrogen accumulates on the surface of a molecular sieve whist the oxygen which may not be adsorbed on account of its low molecular size passes the molecular sieve.

The loading of the molecular sieve may be effected until achieving the condition of equilibrium. Its adsorption capacity is exhausted after this. In order to be able to carry out the process of air fractionization again, the regeneration of the loaded adsorber is required, i.e. a desorption of the adsorber, which is effected by a pressure reduction and subsequent flushing.

In order to be able to ensure an air fractionization with a quasi-continuous extraction of oxygen, one requires at least two molecular sieve chambers which are operated in parallel, of which in each case one is in the adsorption cycle whilst the other simultaneously regenerates.

For flushing the molecular sieve chamber to be regenerated, usually a part gas flow is taken from the product gas flow of the adsorbing molecular sieve chamber and led to the desorbing molecular sieve chamber.

A method for producing a product gas, in particular oxygen, from a feed gas mixture by way of pressure swing adsorption with which a part mass flow of the product gas is led to the desorbing molecular gas chamber for flushing is known from DE 693 23 481 T2. With this, the quantity of the supplied flushing gas is controlled in that the product gas concentration of the flushing gas is measured after the flushing of the desorbing molecular sieve chamber and the supply of flushing gas is stopped after achieving a certain product gas concentration.

The flushing of the desorbing molecular sieve chamber with known air fractionization installations on board aircraft is effected in that a part of the product gas flow is taken from the adsorbing molecular sieve chambers during their complete adsorption cycles and is led as a flushing gas to the desorbing molecular sieve chamber. At the same time the limitation of the flushing gas quantity is effected via a fixed throttle device.

With air fractionization for example at large flight altitudes in which the adsorption cycles are extended on account of the low air pressure prevailing there, this procedural manner leads to the fact that the flushing gas quantity which is made available for flushing the desorbing molecular sieve chamber is greater than is actually required. This reduces the efficiency of the air fractionization installation and has a negative effect on its energy requirement, size and weight.

SUMMARY OF THE INVENTION

It is the object of the invention to modify the method for operating an air fractionization installation for obtaining oxygen on board aircraft such that the above cited disadvantages do not occur, and the economic efficiency of the method is improved. Moreover, a corresponding air fractionization installation is to be provided.

According to the invention, a method for operating an air fractionization installation is provided for obtaining oxygen on board an aircraft, with at least two molecular sieve chambers. A part mass flow of the oxygen obtained in the respective adsorbing molecular sieve chamber is fed for flushing a desorbing molecular sieve chamber, wherein the quantity of the flushing oxygen fed to the desorbing molecular sieve chamber is controlled in dependence on the oxygen concentration and on the mass flow of the product gas.

According to another aspect of the invention, an air fractionization installation for obtaining oxygen on board an aircraft is provided with at least two alternately adsorbing and desorbing molecular sieve chambers, wherein the respective desorbing molecular sieve chamber is flushed with oxygen of the adsorbing molecular sieve chamber. A control means is provided for controlling the flushing oxygen quantity in dependence on the oxygen concentration and on the mass flow of the product gas.

With the method according to the invention for operating an air fractionization installation for obtaining oxygen on board an aircraft with at least two molecular sieve chambers, a part mass flow of the oxygen extracted in the respective adsorbing molecular sieve chamber is led to a desorbing molecular sieve chamber for flushing. At the same time the quantity of the flushing oxygen which is supplied to the desorbing molecular sieve chamber is controlled in dependence on the oxygen concentration and on the mass flow of the product gas, in order to divert only as much oxygen as is required for desorption.

As is usual with the operation of air fractionization installations with several, at least two molecular sieve chambers connected in parallel, a part of the product gas produced by the adsorbing molecular sieve chambers is diverted and led to the desorbing molecular sieve chamber as a flushing gas. During the adsorption of one molecular sieve chamber, the oxygen concentration and the mass flow of the extracted product gas is measured and on reaching minimal permissible values, one switches over from adsorption to desorption, i.e. the previously adsorbing molecular sieve chamber is regenerated.

Departing from the state of the art, with regard to the method according to the invention for operating an air fractionization installation, one does away with providing the desorbing molecular sieve chamber with a flushing gas mass flow which is always the same during the complete adsorption phase. Instead of this, the flushing gas mass flow led to the desorbing molecular sieve chamber is controlled in a manner such that only the quantity of flushing oxygen or flushing gas required for regeneration of the molecular sieve is taken from the product gas flow.

In this manner the efficiency of the air fractionization installation, i.e. the ratio of the product gas which is supplied to the oxygen supply of the aircraft and of the product gas which as a flushing gas is led back again into the air fractionization installation is significantly improved on applying the method according to the invention, at all flight, deployment and operating conditions. Thus the greatest possible oxygen quantity is always made available to the oxygen supply of the aircraft by the air fractionization installation. This also has a positive effect on the energy requirement of the air fractionization installation. Furthermore the size and the weight of the air fractionization installations on board aircraft may be reduced with respect to the known air fractionization installations.

The quantity control of the flushing oxygen led to the desorbing molecular sieve chamber is effected with the method according to the invention advantageously by way of controlling the feed cross section, thus for example by way of a proportional valve.

Here the cross section of the feed conduit to the desorbing molecular sieve chamber and thus as a consequence, the flushing gas mass flow is changed according to the flight and operating conditions. The size of the feed cross section is set such that only the flushing gas quantity required for regenerating the molecular sieve chamber is led to the respective molecular sieve chamber.

Thus for example the feed cross section may be reduced at a great flight altitude.

Since the adsorption phases are extended with an increasing flight altitude, the time duration in which flushing gas is led to a desorbing molecular sieve chamber also increases. This longer flushing phase is compensated by the reduction of the flushing gas mass flow resulting from the reduction of the feed cross section, so that only the quantity of flushing gas required for flushing is removed from the product gas.

It may however often be useful to carry out the quantity control of the flushing oxygen which is supplied to the desorbing molecular sieve chamber by way of changing the feed times.

In this case the flushing gas mass flow diverted from the product gas flow for flushing the desorbing molecular sieve chamber is determined and the feed conduit to the desorbing molecular sieve chamber is closed on reaching the flushing gas quantity required for regeneration of the molecular sieve.

In order to improve the efficiency of the air fractionization installation, it may also be advantageous to carry out the above described quantity control of the flushing gas by way of a combined controlling of the cross section of the feed conduit and of the feed time.

For carrying out the method described above, means for controlling the flushing oxygen quantity in dependence on the oxygen concentration and on the mass flow of the product gas are provided on the air fractionization installation for obtaining oxygen on board an aircraft.

Belonging to these means, apart from a sensor device which determines the oxygen concentration and the mass flow of the product gas, are an evaluation unit which processes the measurement results of the sensor device, and a control unit connected to this evaluation unit, which activates a throttle device arranged in the flushing gas feed on the basis of the evaluation.

For variably throttling the flushing gas supply, the means for controlling the flushing oxygen quantity usefully comprise at least one valve whose throughput cross section is controllable.

The valve, with which it may for example be the case of a proportional valve or a digital valve, is activated by the control unit, wherein the throughput cross section may be enlarged or reduced by way of suitable control impulses, according to the flushing gas mass flow required for regenerating the desorbing molecular sieve chamber.

In a further advantageous embodiment of the air fractionization installation according to the invention, the means for controlling the flushing oxygen quantity comprise a time control by way of which the opening time of the supplying valve may be controlled.

The time control controls the opening time of the valve arranged in the feed in dependence on the flushing gas mass flow which is available and is measured by the sensor device. The time control causes the closure of the feed conduit after the completion of an evaluated throughput time.

The invention is hereinafter explained by way of one embodiment example represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only FIGURE is a block diagram of an air fractionization installation according to the invention for obtaining oxygen on board aircraft.

DESCRIPTION OF THE PREFERRED EMBODIMENTS

Referring to the drawings in particular, air which is suctioned in the vicinity of the aircraft is supplied to an air fractionization installation 2 via a supply conduit 8. The air fractionization installation 2 functions according to the principle of pressure swing adsorption and comprises at least two molecular sieve chambers 4 and 6 which alternately extract oxygen from the suctioned air or are regenerated. The represented molecular sieve chamber 4 is situated in an adsorption phase whilst the molecular sieve chamber 6 is regenerated.

The suctioned air is compacted in the oxygen-extracting, i.e. adsorbing molecular sieve chamber 4 and flows under pressure through a molecular sieve. The nitrogen contained in the air is bonded in an adsorptive manner on this molecular sieve whilst the product gas with which it is mainly the case of oxygen passes through the molecular sieve and is made available to the oxygen supply of the aircraft which is not shown, via a supply conduit 10.

During the extraction of oxygen, in the adsorbing molecular sieve chamber 4 more and more nitrogen molecules settle on the molecular sieve so that its adsorption capacity is exhausted after a certain time. These molecules must be regenerated, i.e. desorbed, in order to be able to fractionize air again.

The desorption of the loaded molecular sieve is effected by a pressure reduction and a subsequent flushing of the molecular sieve chamber 6 with product gas. The product gas which is required for the flushing is made available to the desorbing molecular sieve chamber 6 by the molecular sieve chamber 4 which at this point in time produces the product gas. For this, a part of the product gas mass flow of the adsorbing molecular sieve chamber 4 is diverted from this and led to the desorbing molecular sieve chamber 6 via a feed conduit 12.

The oxygen concentration and the mass flow of the product gas are determined at the output side of the air fractionization installation 2 with the help of a sensor device 14. The sensor device 14 is connected to an evaluation and control means 16 for processing the readings of the sensor device 14. The evaluation and control unit 16 controls the flushing gas flow which is supplied to the desorbing molecular sieve chamber 6 from the adsorbing molecular sieve chamber 4 via the feed conduit 12, on the basis of the readings supplied by the sensor device 14.

For this, a variable throttle valve 18 is arranged in the feed conduit 12, and the evaluation and control unit 16 may activate this valve via a control lead 20. With regard to the throttle valve 18 it is the case of an adjustable proportional valve, but alternatively one may also apply a digital valve or another suitable valve.

The evaluation and control unit 16 in dependence on the values for the oxygen concentration and the mass flow of the product gas recorded by the sensor device 14, and via the control lead 20, causes an enlargement or reduction of the feed cross section of the feed conduit 12 or the closure of this feed conduit 12, by way of the throttle valve 18.

The closure of the feed conduit 12 may also be effected in a time-controlled manner. In dependence on the throttle cross section of the throttle valve 18, the evaluation and control unit 16 determines the opening time of the throttle valve 18 so that this throttle valve 18 is closed on reaching the flushing gas quantity required for the desorption. At the same time apart from the throttle cross section of the throttle valve 18, the product gas flow leaving the adsorbing molecular sieve chambers 4 as well as the flight, deployment and operating variables such as for example the flight altitude are taken into account in the evaluation and control unit 16 on determining the valve opening time. In this manner the evaluation and control unit 16 may provide an optimal time window for the supply of flushing gas which is adapted to the operating conditions.

While a specific embodiment of the invention has been shown and described in detail to illustrate the application of the principles of the invention, it will be understood that the invention may be embodied otherwise without departing from such principles.

Appendix

LIST OF REFERENCE NUMERALS

2—air fractionization installation
4—molecular sieve
6—molecular sieve
8—feed conduit
10—supply conduit
12—feed conduit
14—sensor device
16—evaluation and control unit
18—throttle valve
20—control lead

What is claimed is:

1. A method for operating an air fractionization installation for obtaining oxygen on board an aircraft, with at least two molecular sieve chambers, the method comprising:

providing a throttle valve located in a feed conduit;

feeding a part mass flow of oxygen obtained in a respective adsorbing molecular sieve chamber for flushing a desorbing molecular sieve chamber, said adsorbing molecular sieve chamber being connected to said desorbing molecular sieve chamber via said feed conduit; and controlling a feed cross section of said throttle valve located in said feed conduit such that a quantity of the flushing oxygen fed to the desorbing molecular sieve chamber is based on an oxygen concentration and on the mass flow of product gas delivered from said adsorbing molecular sieve chamber.

2. A method for operating an air fractionization installation according to claim 1, wherein the quantity control of the flushing oxygen fed to the desorbing molecular sieve chamber is additionally controlled by changing a plurality of feed times.

3. A method for operating an air fractionization installation according to claim 2, wherein said control means determines an opening time of said throttle valve such that said throttle valve is closed upon reaching a flushing oxygen gas quantity desorption threshold.

4. A method for operating an air fractionization installation according to claim 1, wherein said product gas is delivered to an oxygen supply of an aircraft.

5. A method for operating an air fractionization installation according to claim 1, wherein said feed cross section is reduced to a minimum feed cross section throughput when said oxygen concentration is a maximum oxygen concentration value, said feed cross section being varied such that a maximum feed cross section throughput is associated with a minimum oxygen concentration value.

6. An aircraft air fractionization installation for obtaining oxygen on board an aircraft, the air fractionization installation comprising:

a first molecular sieve chamber;

a second molecular sieve chamber, said first molecular sieve chamber and said second molecular sieve chamber defining an air fractionization structure;

a conduit supplying gas to said air fractionization structure and receiving product gas exiting from said air fractionization structure;

a feed conduit connecting said first molecular sieve chamber to said second molecular sieve chamber such that one of said chambers, as a desorbing molecular sieve chamber, is flushed with oxygen of product gas of another of said chambers, as an absorbing molecular sieve chamber;

a sensing means located downstream of said air fractionization structure for sensing oxygen concentration and mass flow of said product gas exiting from said air fractionization structure;

a throttle valve located in said feed conduit and having a throughput cross section that may be varied from a minimum to a maximum throughput;

a control means for controlling said throughput cross section to continuously vary said throughput cross section corresponding to variations in oxygen concentration and in mass flow of the product gas sensed by said sensing means, said control means controlling an amount of said product gas supplied to said desorbing molecular sieve chamber from said adsorbing molecular sieve chamber.

7. An air fractionization installation according to claim 6, wherein said control means comprises a time control by way of which the opening time of the feed valve is controlled.

8. An air fractionization installation according to claim 7, wherein said control means determines an opening time of said throttle valve such that said throttle valve is closed upon reaching a flushing oxygen gas quantity desorption threshold.

9. An air fractionization installation according to claim 6, wherein said product gas is delivered to an oxygen supply of an aircraft.

10. An air fractionization installation according to claim 6, wherein said minimum throughput is associated with a maximum oxygen concentration value, said maximum throughput being associated with a minimum oxygen concentration value.

11. A method for obtaining oxygen on board an aircraft, the method comprising:

providing a bypass conduit;

providing a throttle valve located in said bypass conduit having a variable feed cross section;

providing an air fractionization installation with a first molecular sieve chamber and a second molecular sieve chamber, said first molecular sieve chamber being in communication with said second molecular sieve chamber via said bypass conduit;

delivering gas to said air fractionization installation and providing product gas exiting from said air fractionization installation;

sensing oxygen concentration and mass flow of said product gas exiting said air fractionization installation with a sensor located downstream of said air fractionization installation;

continuously varying said feed cross section of said throttle valve based on a variation of said oxygen concentration and a variation of mass flow detected via said sensor such that one of said molecular sieve chambers as a desorbing molecular sieve chamber is flushed with oxygen of product gas of another of said chambers as an adsorbing molecular sieve chamber, whereby said feed cross section of said throttle valve controls an amount of said product gas supplied to one of said molecular sieve chambers functioning as a desorbing molecular sieve chamber from another of said chambers functioning as an adsorbing molecular sieve chamber.

12. A method for operating an air fractionization installation according to claim 11, wherein the quantity control of the flushing oxygen fed to the desorbing molecular sieve chamber is controlled by changing a plurality of feed times.

13. A method for operating an air fractionization installation according to claim 11, wherein said control means comprises at least one throttle valve with a controlled throughput cross section.

14. A method for operating an air fractionization installation according to claim 12, wherein said control means comprises a time control by way of which the opening time of the feed valve is controlled.

15. A method for operation an air fractionization installation according to claim 13, wherein said control means determines an opening time of said throttle valve such that said throttle valve is closed upon reaching a flushing oxygen gas quantity desorption threshold.

16. A method for operating an air fractionization installation according to claim 11, wherein said product gas is delivered to an oxygen supply of an aircraft.

17. A method for operating an air fractionization installation according to claim 11, wherein said throughput cross section is varied from a minimum to a maximum throughput, said minimum throughput being associated with a maximum oxygen concentration value, said maximum throughput being associated with a minimum oxygen concentration value.

* * * * *